United States Patent [19]

Pellet et al.

[11] Patent Number: 4,666,875

[45] Date of Patent: May 19, 1987

[54] CATALYTIC CRACKING CATALYSTS USING SILICOALUMINOPHOSPHATE MOLECULAR SIEVES

[75] Inventors: Regis J. Pellet, Croton; Peter K. Coughlin, Yorktown Heights; Mark T. Staniulis, Peekskill; Gary N. Long, Putnam Valley; Jule A. Rabo, Armonk, all of N.Y.

[73] Assignee: Union Carbide Corporation, Danbury, Conn.

[21] Appl. No.: 861,758

[22] Filed: May 9, 1986

Related U.S. Application Data

[63] Continuation of Ser. No. 675,279, Nov. 27, 1984, abandoned.

[51] Int. Cl.$^4$ .................. B01J 27/18; B01J 29/28

[52] U.S. Cl. ........................................ 502/65; 502/63; 502/214

[58] Field of Search .................. 502/63, 65, 214

[56] References Cited

U.S. PATENT DOCUMENTS 3,140,249  7/1964  Plank et al. .................. 208/120
4,440,871  4/1984  Lok .................................. 502/214

Primary Examiner—Carl F. Dees
Attorney, Agent, or Firm—Vincent J. Vasta

[57] ABSTRACT

Cracking catalysts containing silicoaluminophosphate molecular sieves are disclosed. Such catalysts are derived from specific silicoaluminophosphate molecular sieves of U.S. Pat. No. 4,440,871. The catalyst when used for the conversion of hydrocarbons provide product mixtures different from those obtained by use of aluminosilicates based catalysts.

23 Claims, No Drawings

CATALYTIC CRACKING CATALYSTS USING SILICOALUMINOPHOSPHATE MOLECULAR SIEVES

This application is a continuation of prior U.S. application Ser. No. 675,279, filing date 11/27/84, now abandoned.

FIELD OF THE INVENTION

The present invention relates to cracking catalysts formed from specific silicoaluminophosphate molecular sieves described in U.S. Pat. No. 4,440,871.

BACKGROUND OF THE INVENTION

The development of cracking catalysts has heretofor generally been limited to the preparation of modified zeolites for use as cracking catalysts and to the interaction of such zeolites with other inorganic oxide materials. The following patents are representative of the prior art dealing with zeolite based cracking catalysts:

The use of conversion catalysts formed from a zeolite dispersed in a siliceous matrix has been disclosed in U.S. Pat. Nos. 3,140,249 and 3,352,796.

The use of blended matrix components, e.g., a catalyst comprising a zeolite, an inorganic oxide matrix and inert fines, which may be alpha alumina, is disclosed in U.S. Pat. No. 3,312,615. Catalysts comprising an amorphous silica-alumina, separately added alumina and a zeolite are disclosed in U.S. Pat. No. 3,542,670 and catalyst comprising a zeolite, an amorphous hydrous alumina and alumina monohydrate are disclosed in U.S. Pat. No. 3,428,550.

It has been disclosed that the steam and thermal stability of Y zeolites can be improved by the use of zeolites having a low level of alkali metal content and a unit cell size less than about 24.45 Angstroms (See: U.S. Pat. Nos. 3,293,192 and Re. 28,629 (Reissue of U.S. Pat. No. 3,402,996)).

Further, it has been disclosed (U.S. Pat. No. 3,591,488) that the hydrogen or ammonium form of a zeolite may be treated with $H_2O$ at a temperature ranging from about 800° to about 1500° F., or then subsequently cation exchange the steam and water treated zeolite with cations which may be rare earth metal cations. The method increases the silica to alumina mole ratio of the zeolite and also the defect structure. U.S. Pat. No. 3,676,368 discloses a rare earth exchanged-hydrogen faujasite containing from 6 to 14 percent rare earth oxides. U.S. Pat. No. 3,957,623 discloses a rare earth exchanged zeolite having a total of 1 to 1 weight percent rare earth metal oxide. U.S. Pat. No. 3,607,043 discloses a process for preparing a zeolite having a rare earth content of 0.3 to 10 weight percent.

U.S. Pat. No. 4,036,739 discloses hydrothermally stable and ammonia stable Y zeolite in which a sodium Y zeolite is ion exchanged to partially exchange sodium ions for ammonium ions, followed by steam calcination and a further ion exchange with ammonium to reduce the final sodium oxide content to below 1 weight percent, followed by calcination of the reexchanged product, or according to U.S. Pat. No. 3,781,199, the second calcination may be conducted after the zeolite is admixed with a refractory oxide.

The above discussed prior art is representative of past and present day formulations of catalysts for fluid catalytic cracking (FCC). Recently a new class of materials was disclosed in U.S. Pat. No. 4,440,871. The materials of U.S. Pat. No. 4,440,871 are crystalline microporous silicoaluminophosphate molecular sieves and are disclosed as employable in cracking processes. Several of the "SAPOs" of U.S. Pat. No. 4,440,871 were evaluated for their catalytic cracking activity by use of an n-butane cracking test from which data a first-order rate constant was calculated. Although the first order rate constants for all the SAPOs tested showed such to have catalytic activity, the rate constants varied from 0.2 to 7.4. The use of a mixture of aluminosilicates and specific silicoaluminosilicates is disclosed in copending U.S. Ser. No. 675,283, filed concurrently herewith and commonly assigned.

The instant invention relates to cracking catalysts and to fluid catalytic cracking processes. The catalysts comprise a specific class of silicoaluminophosphate molecular sieves disclosed in U.S. Pat. No. 4,440,871 having particular pore sizes and are preferably employed with at least one inorganic oxide present as a binder and/or matrix component.

SUMMARY OF THE INVENTION

The instant invention relates to the catalytic cracking of crude oil feedstocks to produce lower boiling hydrocarbons. The process of this invention is carried out by contacting said feedstock with a specific class of the silicoaluminophosphate molecular sieves of U.S. Pat. No. 4,440,871.

The silicoaluminophosphates employable herein are described in U.S. Pat. No. 4,440,871, issued Apr. 3, 1984 and are characterized in their calcined form by an adsorption of isobutane of at least 2 percent by weight at a pressure of 500 torr and a temperature of 20° C. In a further embodiment, such silicoaluminophosphates are also characterized in their calcined form by an adsorption of triethylamine of greater than 5 percent by weight at a pressure of 2.6 torr and a temperature of 22° C.

DETAILED DESCRIPTION OF THE INVENTION

The present invention relates to new catalytic cracking catalysts containing silicoaluminophosphate molecular sieves and to the process of their use in catalytic cracking processes. The catalytic cracking catalysts of the instant invention are derived from the novel silicoaluminophosphates disclosed in U.S. Pat. No. 4,440,871, incorporated herein by reference thereto.

The silicoaluminophosphates employed in the present invention will be referred to herein, solely for the purpose of reference herein, as "SAPO" molecular sieves as a short hand notation consistent with that employed in U.S. Pat. No. 4,440,871. Catalysts employing SAPOs contain certain of the silicoaluminophosphate catalysts of U.S. Pat. No. 4,440,871, discussed hereinafter, and are generally employed in conjunction with at least one inorganic oxide matrix component.

The term "SAPO" is employed herein as denominating the "SAPO" molecular sieves of U.S. Pat. No. 4,440,871. The "SAPO" molecular sieves of U.S. Pat. No. 4,440,871 are disclosed as being microporous crystalline silicoaluminophosphates the pores of which are uniform and have nominal diameters of greater than about 3 Angstroms and whose essential empirical chemical composition in the as-synthesized and anhydrous form is:

wherein "R" represents at least one organic templating agent present in the intracrystalline pore system; "m" has a value of from 0.02 to 0.3; "m" represents the moles of "R" present per mole of $(Si_xAl_yP_z)O_2$; "x", "y" and "z" represent the mole fractions of silicon, aluminum and phosphorus respectively, present as tetrahedral oxides, said mole fractions being such that they are within the pentagonal compositional area defined by points A,B,C,D, and E which is FIG. 1 of U.S. Pat. No. 4,440,871. The molecular sieves of U.S. Pat. No. 4,440,871 are also characterized as silicoaluminophosphate material having a three-dimensional microporous framework structure of $PO_2^+$, $AlO_2^-$ and $SiO_2$ tetrahedral units, and whose essential empirical chemical composition on an anhydrous basis is:

$$mR:(Si_xAl_yP_z)O_2$$

wherein R represents at least one organic templating agent present in the intracrystalline pore system; "m" represents the moles of "R" present per mole of $(Si_x Al_y P_z)O_2$ and has a value of from zero to 0.3; "x", "y" and "z" represent respectively, the mole fractions of silicon, aluminum and phosphorus present in the oxide moiety, said mole fractions being within the compositional area bounded by points A, B, C, D and E on the ternary diagram which in FIG. 1, said silicoaluminophosphate having a characteristic X-ray powder diffraction pattern which contains at least the d-spacings set forth below in any one of Tables, I, III, V, VII, IX, XIII, XVII, XXI, XXIII or XXV of U.S. Pat. No. 4,440,871. Further the SAPO molecular sieves may be calcined at a temperature sufficiently high to remove at least some of the organic templating agent present in the intracrystalline pore system. SAPOs employable herein include SAPO-5, SAPO-11, SAPO-31, SAPO-37, SAPO-40 and SAPO-41.

The SAPO catalysts of the instant invention are prepared by the use of the silicoaluminophosphates of U.S. Pat. No. 4,440,871, as hereinbefore described, which are further characterized in their calcined form by an adsorption of isobutane of at least 2 percent by weight at a pressure of 500 torr and a temperature of 20° C. In a further embodiment, such SAPOs are also characterized in their calcined form by an adsorption of triethylamine of greater than 5 percent by weight at a pressure of 2.6 torr and a temperature of 22° C. The above characterization of the silicoaluminophosphates (SAPOs) employed in the instant invention relates to an adsorption characterization that is carried out on a SAPO which has been subjected to a post synthesis treatment, e.g., calcination or chemical treatment, to remove a substantial portion of the template "R" which is present as a result of synthesis. Although a particular SAPO is characterized herein by its adsorption of isobutane or triethylamine as being a SAPO in its calcined form, the instant invention necessarily includes the use of a non-calcined SAPO which is characterized by such adsorption in its calcined form, since upon use of such a non-calcined SAPO in the instant process at catalytic cracking conditions the SAPO will be calcined or hydrothermally treated in situ so as to have the characteristic adsorption of isobutane or triethylamine. Thus, the SAPO will be rendered in situ to a form characterized by the aforementioned adsorption of isobutane due to the presence of template "R" which is present as a result of synthesis, although the calcined form of SAPO-11 is characterized by the aforementioned adsorption of isobutane or triethylamine. Thus, reference to a SAPO having a particular adsorption characteristic in its calcined form is not intended to exclude the use of the SAPO in its as-synthesized form which upon calcination, hydrothermal treatment or other treatment, e.g., ion exchange, would have such adsorption characteristics.

The term "thermal treatment" is employed here to denominate both a thermal calcination in the presence of air or inert gas, e.g., nitrogen, and a hydrothermal calcination (thermal calcination in the presence of steam). Thermal treatment is typically carried out at a temperature in excess of 300° C. for a period in excess of 0.25 hours and when the thermal treatment is a hydrothermal treatment it is typically carried out in the presence of at least about 20 percent steam by volume in air. The source of the steam is not important and may be provided from an external source or may be generated in situ at the temperatures employed for the hydrothermal treatment. As aforementioned, a SAPO may also be employed in the instant process in its as-synthesized form since an in situ hydrothermal treatment will be provided upon introduction of the as-synthesized SAPO to the process under catalytic cracking conditions.

The SAPOs may also be ion-exchanged by contacting the silicoaluminophosphate molecular sieve (with or without the presence of an inorganic oxide matrix component) with a solution of at least one hydrogen-forming cation, such as $NH_4^+$, and $H^+$ and quaternary ammonium. It is believed that the selected SAPO(s) may also include cations selected from the group consisting of cations of Group IIA, Group IIIA, Groups IIIB to VIIBB and rare earth cations selected from the group consisting of cerium, lanthanum, praseodymium, neodymium, promethium, samarium, europium, gadolinium, terbium, dysprosium, holmium, erbium, thulium, ytterbium, lutetium and mixtures thereof. At present, the presence of rare earth cations with the SAPO molecular sieves has not been observed to be beneficial to the activity of the SAPO component. The exact nature of the relationship of multi-valent cations and SAPO catalysts is not clearly understood at present, although in some instances their presence may be beneficial. As a result of the ion-exchange, the silicoaluminophosphates may contain at least one cation, e.g., hydrogen-forming cation, which is different from the cations initially associated with the silicoaluminophosphates molecular sieves as a result of their synthesis. The cation present as a result of ion exchange is preferably present in an effective amount between about 0.1 weight percent and about 20 percent, based on the weight of the starting silicoaluminophosphate molecular sieve and is typically present in an effective amount between about 0.5 weight percent and about 10 weight percent.

It is understood that the aforementioned thermal treatment and ion-exchanges may be carried out one or more times in any order and that such variations are within the scope of this invention.

The ion-exchange is generally carried out by preparing a slurry of the silicoaluminophosphate catalyst by adding about 5 to 15 volumes of water per volume of catalyst, after which a solution of a selected cation is added. The ion exchange is generally carried out at room temperature and the resulting solution is then heated to above about 50° C. and stirred at this temperature for about 0.5 to 3 hours. This mixture is then filtered and water washed to remove excess anion present as a result of the solution of the cation salt.

The silicoaluminophosphate molecular sieve is typically employed with at least one inorganic oxide matrix component, such inorganic oxide matrix components typically employed heretofore in formulating FCC catalysts, including: amorphous catalytic inorganic oxides such as catalytically active silica/aluminas, clays, silicas, aluminas, silica-aluminas, silica-zirconias, silica-magnesias, alumina-borias, alumina-titanias and the like and mixtures thereof. The matrix may be in the form of a sol, hydrogel or gel and is typically an alumina, silica or silica-alumina component such as a conventional silica-alumina cracking catalyst, several types and compositions of which are commercially available. The matrix may itself provide a catalytic effect, such as that observed for catalytically active silica/aluminas, or it may be essentially inert. The matrix may act as a "binder" in some instances although in some instances the final catalyst may be spray dried or formed without the need of a binder. These matrix materials may be prepared as a cogel of silica and alumina or as alumina precipitated on a preformed and preaged hydrogel. Silica may be present as a major matrix component in the solids present in the matrix e.g. present in an amount between about 5 and about 40 weight percent and preferably between about 10 and about 30 weight percent. The silica may also be employed in the form of a cogel comprising about 75 weight percent silica and about 25 weight percent alumina or comprising about 87 weight percent silica and about 13 weight percent alumina. The inorganic oxide matrix component will typically be present in the final catalyst in an amount between about 0 and about 99 weight percent, preferably between about 5 and about 90 weight percent, based on the total catalyst. It is also within the scope of the instant invention to employ other materials with the silicoaluminophosphates in the final cracking catalysts, including clays, carbon monoxide oxidation promoters, etc.

Representative of matrix systems employable herein are disclosed in British patent specification No. 1,315,553, published May 2, 1973 and U.S. Pat. Nos. 3,446,727 and 4,086,187, such being incorporated herein by reference thereto.

As above mentioned, the catalysts of the present invention may be employed with a matrix component and this may be a silica or alumina component. The alumina component which may comprise discrete particles of various aluminas, e.g., pseudobeohmite. The alumina component may be in the form of discrete particles having a total surface area, as measured by the method of Brunauer, Emmett and Teller (BET), greater than about 20 square meters per gram ($M^2/g$), preferably greater than 145 $M^2/g$, for example, from about 145 to about 300 $M^2/g$. The pore volume of the alumina component is typically be greater than 0.35 cc/g. The average particle size of the alumina particles is generally less than 10 microns and preferably less than 3 microns. The alumina may be employed alone as the matrix or composited with the other matrix components. The alumina component may be any alumina and has preferbly been preformed and placed in a physical form such that its surface area and pore structure are stabilized so that when the alumina is added to an impure, inorganic gel containing considerable amount of residual soluble salts, the salts will not alter the surface and pore characteristics measurably nor will they promote chemical attack on the preformed porous alumina which could undergo change. For example, the alumina is typically an alumina which has been formed by suitable chemical reaction, the slurry aged, filtered, dried, washed free of residual salt and then heated to reduce its volatile content to less than about 15 weight percent. The alumina component may be present in the final catalyst in an amount ranging between about 5 and about 95 weight percent, preferably between about 10 and about 30 weight percent based on the total catalyst. Further, an alumina hydrosol or hydrogel or hydrous alumina slurry may be used in the catalyst preparation.

Mixtures of one or more silicoaluminophosphate molecular sieves and one or more inorganic matrix components may be formed into a fina form for the catalyst by standard catalyst forming techniques including spray-drying, pelleting, extrusion and other suitable conventional means. The use of spray drying procedures is the preferred means by which catalysts are prepared and such procedures are well known in the art. When the catalyst is formed as extruded pellets and dried in air such are typically crushed and sized to a size less than 150 microns.

Catalysts containing SAPOs may be prepared by any conventional method. One method of preparing such catalysts employing silica-alumina and porous alumina is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. The alumina may be prepared by reacting solutions of sodium aluminate and aluminum sulfate under suitable conditions, aging the slurry to give the desired pore properties of the alumina, filtering drying, reslurry in water to remove sodium and sulfate ions and drying to reduce volatile matter content to less than 15 weight percent. The alumina may then be slurried in water and blended in proper amounts, with a slurry of impure silica-alumina hydrogel. The SAPO molecular sieve component may then be added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is typically employed after a calcination which may be an in situ calcination in the process under catalytic cracking conditions.

Catalytic cracking with the catalyst of the present invention can be conducted in any conventional catalytic cracking manner under effective catalytic cracking conditions. Suitable catalytic cracking conditions include a temperature ranging between about 400° F. and about 1600° F., preferably between about 700° F. and about 1600° F., and a pressure ranging from about sub-atmospheric to several atmospheres, typically between about atmospheric (14.7 psia) and about 100 psia. The process may be carried out in fixed bed, moving bed, ebullating bed, slurry, transferline, riser reactor or fluidized bed operation. The catalyst of the present invention can be used to convert any of the conventional hydrocarbon feeds used in catalytic cracking, that is, it can be used to crack naphthas, gas oil and residual oils having a high content of metal contaminants. It is especially suited for cracking hydrocarbons boiling in the gas oil range, that is, hydrocarbon oils having an atmospheric pressure boiling point ranging from about 420° F. to about 1800° F. to naphthas to yield not only products having a lower boiling point than the initial feed but also products having an improved octane number.

The term "crude oil feed" is used herein to denominate any full range crude oil from primary, secondary or tertiary recovery from conventional or offshore oil fields and feedstocks derived therefrom. "Crude oil feeds" may include any full range "syncrude" such as those can be derived from coal, shale oil, tar sands and bitumens. The crude may be virgin (straight run) or generated synthetically by blending. It is generally desirable, however, to first desalt the crude since sodium chloride is known to be a poison for most cracking operations. Further the term crude oil derived feed is meant to include component parts of the crude which are generally employed as catalytic cracking feeds or potential feeds therefor and include: feeds such as distillate gas oils, heavy vacuum gas oils, atmospheric and vacuum resids, syncrudes (from shale oil, tar sands, coal), feed derived from hydrocrackers, hydrotreaters, cokers, pyrolysis processes and high boiling FCC product recycle fractions; and fractions boiling above the traditional end of the gasoline boiling range which generally includes compounds containing greater than about eleven carbon atoms and combinations thereof.

In addition, the instant catalyst can be effectively used in an FCC (fluid catalytic cracking) process wherein a carbon-hydrogen fragmentation compound is employed in admixture with the crude oil feed. Such a process will be referred to herein as an "FCC-CHFC process".

The term "carbon-hydrogen fragmentation compound(s)" is employed herein to mean materials comprising a lesser number of carbon atoms than found in materials within the gasoline boiling range, preferably those materials containing 5 or less carbon atoms, that fit into any of the categories of:

(a) Hydrogen-rich molecules, i.e. molecules with wt. % hydrogen ranging from about 13.0-25.0 wt. %. This may include light paraffins, i.e., $CH_4$, $C_2H_6$, $C_3H_8$ and other materials.

(b) Molecules whose chemical structure permits or favors the transfer of carbon-hydrogen fragments may be employed. This includes $CH_3OH$, other low boiling alcohols such as ethanol, n-propanol, isopropanol, n-butanol, isobutanol, etc., aliphatic ethers, e.g., dimethyl ether, and other oxygen compounds (acetals, aldehydes, ketones).

(c) Secondary Reaction Products from materials in categories (a) or (b) above that are carbon-hydrogen fragmentation compounds themselves, or transfer hydrogen. This includes olefins, naphthenes, or paraffins.

(d) Classes of materials which are structurally or chemically equivalent to those of category (c), notably olefins, etc.; and (e) A combination of any or all of the materials in categories (a) through (d).

The preferred carbon-hydrogen fragmentation compounds are methanol, dimethyl ether and $C_2$–$C_5$ olefins, with methanol and dimethyl ether being the most preferred.

Further, the FCC-CHFC process is believed to involve combination reactions which are believed to be effective, at least in part, in removing sulfur, oxygen, nitrogen and metal contaminants found in a whole crude or a heavy hydrocarbon portion thereof.

The operation of an FCC-CHFC type process is generally carried out at temperatures within the range of 400° F. up to about 1400° F. and more usually within the range of 700° F. to about 1200° F. at pressures selected from within the range of below atmospheric up to several hundred pounds per square inch gauge (psig) but normally less than 200 psig. Preferred conditions include a temperature within the range of about 800° F. to about 1150° F. and pressures within the range of atmospheric to about 100 psig and higher.

The carbon-hydrogen fragmentation compound may be provided to the process in most any way so long as it is present when contact with the catalyst material is effected, i.e. in situ generation is suitable.

In the preferred operation an FCC-CHFC process methanol is used in combination with a gas oil type of hydrocarbon charge stock. The weight percent of methanol in the hydrocarbon charge passed to the cracking or conversion operation will vary considerably and may be selected from within the range of between about 1% and about 25 percent by weight, it being preferred to maintain the ratio within the range between about 5% and about 20, based on the weight of the feed. However, this may vary depending upon the hydrogen deficiency of the high molecular weight hydrocarbon charge, the amount of sulfur, nitrogen and oxygen in the oil charge, the amount of polycyclic aromatics, the type of catalyst employed, and the level of conversion desired. It is preferred to avoid providing any considerable or significant excess of methanol with the charge because of its tendency to react with itself under some conditions.

The FCC-CHFC process preferably employs a fluidized catalyst system at low pressures without the need for high pressure hydrogen gas. Such a system promotes the highly efficient contact of relatively inexpensive carbon-hydrogen fragmentation compounds with heavy, refractory molecules in the presence of high-surface area cracking catalyst. Intermolecular hydrogen-transfer interactions, e.g., methylating reactions, and catalytic cracking reactions are effected in the presence of fluidized catalyst particles and act to minimize problems due to diffusion/mass transport limitations and/or heat transfer.

The FCC-CHFC process can make use of the relatively cheap carbon-hydrogen fragmentation compounds readily available in petroleum refineries, such as light gas fractions, light olefins, low boiling liquid streams, etc., and, in particular, can employ methanol, a product which is readily available in quantity, either as a transportable product from overseas natural gas conversion processes, or as a product from large scale coal, shale, or tar sand gasification. It also can utilize carbon monoxide (in combination with contributors such as water or methanol), which gas is readily available from refinery regeneration flue gas (or other incomplete combustion processes), or from coal, shale, or tar sand gasification. Highly efficient recycle of carbon-hydrogen fragmentation compounds can also be effected.

The following example was carried out to illustrate the instant invention and is not intended to be limiting thereof.

EXAMPLE 1

Two catalysts were prepared for evaluation according to ASTM test method D-3907 (Microactivity Test).

The two catalysts were prepared using the non-zeolitic molecular sieve SAPO-5 and the zeolite LZ-210. SAPO-5 was prepared according to U.S. Pat. No. 4,440,871 and was employed after air calcination. LZ-210 ($SiO_2$ to $Al_2O_3$ ratio of 9.0) was prepared according to E.P.C. Publication No. 82,211.

After preparation of SAPO-5 the material was treated in 100 percent steam at 760° C. for 2 hours to simulate the effect of actual use in a cracking process. The LZ-210 component was then rare earth exchanged to give a rare earth exchanged LZ-210 containing 9.9 weight percent rare earth expressed as the oxide. The rare earth exchange was carried out with a rare earth chloride solution containing 46.0% by weight rare earth, expressed as the oxides with the rare earth component comprising 60.0% lanthanum ($La_2O_3$), 21.5% neodymium ($Nd_2O_3$), 10.0% cerium ($CeO_2$), 7.5% praseodymium ($Pr_6O_{11}$) and about 1.0% other rare earths.

A matrix for the SAPO-5 and LZ-210 was prepared by mixing 90 percent by weight of a silica/alumina, sold by the Davison Division of W. R. Grace under the trade designation MS13/110, and 10 percent by weight of a microcrystalline cellulose extrusion aid. The mixture was extruded in the form of 1/16 inch pellets and dried in air at 110° C. for about 16 hours and then steam deactivated in 100 percent steam at 760° C. for 2 hours. The steam deactivated material was then crushed and sized to 60 to 200 mesh (U.S. Standard).

The SAPO-5 and LZ-210 catalysts were each prepared by mixing 15 percent by weight of the selected material with 85 percent by weight of the matrix. The LZ-210 was steam deactivated in 100% steam at 760° C. for 2 hours prior to use in the preparation of the catalyst. The final catalyst mixtures were then calcined at 590° C. in air for 3 hours. Each catalyst was evaluated in a single run according to ASTM test method D-3907 with the following four modifications of ASTM test method D-3907. First, the end boiling point of the products identified as gasoline products was 431° F. Second, the nitrogen post stripping of the catalyst was at 30 milliliters/min. for a period of 23 minutes to 27 minutes. Third, the conversion is the measured conversion and not the standardized conversion of the ASTM test method. Fourth, the feedstock employed in the test method had an API gravity of 24.0°, and IBP (Initial Boiling Point) of 354° F., FBP (Final Boiling Point) of 1077° F. and a UOP Factor K of 11.8.

The "Wt. % Conversion" is the measured weight percent conversion. "Wt. % Gasoline" is the weight percent of hydrocarbons in the product from $C_5$ hydrocarbons to hydrocarbons boiling below 431° F. "Wt. % Gas" is defined as those hydrocarbons boiling below $C_4$ in the product, as a weight percent of feed. The "Wt. % Coke" is defined as the residue left on the used catalyst after post stripping as set forth in ASTM test method D-3907, as a weight percent of the feed. "Wt. % $C_4s$" is defined as the weight percent of isobutane, n-butane and butylenes of the product. The results, as weight percents, were as follows:

| | Catalyst | |
|---|---|---|
| | SAPO-5 | LZ-210 |
| Wt. % Conversion | 57.7 | 57.2 |
| Wt. % Gasoline | 37.2 | 41.4 |
| Wt. % Gas | 6.6 | 5.5 |
| Wt. % Coke | 3.9 | 3.1 |

-continued

| | Catalyst | |
|---|---|---|
| | SAPO-5 | LZ-210 |
| Wt. % $C_{4s}$ | 10.0 | 7.33 |

The above results demonstrate that SAPO-5 is active as a cracking catalyst giving substantially the same conversion as catalysts containing the zeolitic aluminosilicate LZ-210 while providing a different product distribution.

EXAMPLE 2

An FCC-CHFC process is carried out using a gas oil feed comprising a heavy vacuum gas oil in a cracking operation. The vacuum gas oil is characterized by the API gravity (60° F.) of 20.7, an average molecular weight of about 400±10 and a boiling range between about 700° F. and about 1100° F. The carbon-hydrogen fragmentation compound is methanol and is present in an amount of 10 percent by weight. The catalyst contains SAPO-5 and is introduced to a riser FCC unit after heating the catalyst to about 1000° F.±20° F. The hydrocarbon products show improved selectivity to motor fuel (hydrocarbon) products by addition of methanol as characterized by the presence of hydrocarbon fuels boiling below the boiling range of the gas oil feed.

What is claimed is:

1. The process for the preparation of a cracking catalyst comprising: (1) the treatment of at least one silicoaluminophosphate molecular sieve of U.S. Pat. No. 4,440,871 characterized in its calcined form by an adsorption of isobutane of at least 2 percent by weight at a pressure of 500 torr and a temperature of 20° C. with an effective amount of at least one exchange cation selected from the group consisting of H+, ammonium, Group IIA, Groups IIIB to VIIB, cerium, lanthanum, praseodymium, neodymium, promethium, samarium, europium, gadolinium, terbium, dysprosium, holmium, erbium, thulium, ytterbium, lutetium and mixtures thereof; and (2) admixing the product of step (1) with at least one inorganic oxide matrix component.

2. The process of claim 1 wherein said SAPO is a microporous crystalline silicoaluminophosphates the pores of which are uniform and have nominal diameters of greater than about 3 Angstroms and whose essential empirical chemical composition in the as-synthesized and anhydrous form is:

$$mR:(Si_xAl_yP_z)O_2$$

wherein "R" represents at least one organic templating agent present in the intracrystalline pore system; "m" has a value from 0.02 to 0.3; "m" represents the moles of "R" present per mole of $(Si_xAl_yP_z)O_2$; "x", "y" and "z" represent the mole fractions of silicon, aluminum and phosphorus respectively, present as tetrahedral oxides, said mold fractions being such that they are within the pentagonal composition area defined by points A,B,C,D, and E of the ternary diagram which is FIG. 1 of the drawing, of U.S. Pat. No. 4,440,871.

3. The process of claim 2 wherein said SAPO is a silicoaluminophosphate molecular sieve having a three-dimensional microporous framework structure of $PO_2^+$, $AlO_2^-$ and $SiO_2$ tetrahedral units, and whose essential empirical chemical composition on an anhydrous basis is:

$$mR:(Si_xAl_yP_z)O_2$$

wherein R represents at least one organic templating agent present in the intracrystalline pore system; "m" represents the mole of "R" present per mole of $(Si_xAl_yP_z)O_2$ and has a value of from 0.3; "x", "y" and "z" represent respectively, the mole fractions of silicon, aluminum and phosphorus present in the oxide moiety, said mole fractions being within the compositional area bounded by points A,B,C,D, and E on the ternary diagram which is FIG. 1, said silicoaluminophosphate having a characteristic X-ray powder diffraction pattern which contains at least the d-spacings set forth below in any one of Tables I, III, V, VII, IX, XIII, XVII XXI, XXIII or XXV of U.S. Pat. No. 4,440,871.

4. The process of claim 1 wherein the SAPO molecular sieve is ammonium exchanged one or more times.

5. The process of claim 1 wherein the SAPO molecular sieve contains between about 0.05 weight percent and about 20 weight percent of said cation.

6. The process of claim 2 wherein the SAPO molecular sieve contains between about 0.5 weight percent and about 10 weight percent ammonium cation.

7. The catalyst prepared by the process of claim 1.

8. The catalyst prepared by the process of claim 2.

9. The catalyst prepared by the process of claim 3.

10. A cracking catalyst comprising: (1) a silicoaluminophosphate molecular sieve of U.S. Pat. No. 4,440,871 characterized in its calcined form by an adsorption of isobutane of at least 2 percent by weight at a pressure of 500 torr and a temperature of 20° C. and having an effective amount of the cations associated with said silicoaluminophosphate molecular sieve selected from the group consisting of H+, ammonium, Group IIA, groups IIIB to VIIB, cerium, lanthanum, praseodymium, neodymium, promethium, samarium, europium, gadalinium, terbium, dysprosium, holmium, erbium, thulium, ytterbium, luterium and mixtures thereof; and (2) at least one inorganic oxide matrix component.

11. The catalyst of claim 10 wherein said silicoaluminophosphate is further characterized by an adsorption of triethylamine of greater than 5 percent by weight at a pressure of 2.6 torr and a temperature of 22° C.

12. The catalyst of claim 11 wherein said SAPO molecular sieve is a silicoaluminophosphate having at least a portion of its cations as H+ or NH4+.

13. The catalyst of claim 12 wherein said cation is NH4+.

14. The catalyst of claim 10 wherein the silicoaluminophosphate molecular sieve is selected from the group consisting of SAPO-5, SAPO-11, SAPO-31, SAPO-37, SAPO-40, SAPO-41 and mixtures thereof.

15. The catalyst of claim 14 wherein the silicoaluminophosphate is SAPO-5.

16. The catalyst of claim 14 wherein the silicoaluminophosphate is SAPO-11.

17. The catalyst of claim 14 wherein the silicoaluminophosphate is SAPO-31.

18. The catalyst of claim 14 wherein the silicoaluminophosphate is SAPO-40.

19. The catalyst of claim 14 wherein the silicoaluminophosphate is SAPO-41.

20. The catalyst of claim 10 wherein said silicoaluminophosphate is a microporous crystalline silicoaluminophosphate the pores of which are uniform and have nominal diameters of greater than about 3 Angstroms and whose essential empirical chemical composition in the as-synthesized and anhydrous form is:

$$mR:(Si_xAl_yP_z)O_2$$

wherein "R" represents at least one organic templating agent present in the intracrystalline pore system; "m" has a value from 0.02 to 0.3; "m" represents the moles of "R" present per mole of $(Si_xAl_yP_z)O_2$; "x", "y" and "z" represent the mole fractions of silicon, aluminum and phosphorus respectively, present as tetrahedral oxides, said mole fractions being such that they are within the pentagonal composition area defined by points A,B,C,D, and E of the ternary diagram which is FIG. 1 of the drawing, of U.S. Pat. No. 4,440,871.

21. The catalyst of claim 10 wherein said SAPO is a silicoaluminophosphate material having a three-dimension microporous framework structure of $PO_2^+$, $AlO_2^-$ and $SiO_2$ tetrahedral units, and whose essential empirical chemical composition on an anhydrous basis is:

$$mR:(Si_xAl_yP_z)O_2$$

wherein R represents at least one organic templating agent present in the intracrystalline pore system; "m" represents the mole of "R" present per mole of $(Si_xAl_yP_z)O_2$ and has a value of from zero to about 0.3; "x", "y" and "z" represent respectively, the mole fractions of silicon, aluminum and phosphorus present in the oxide moiety, said mole fractions being within the compositional area bounded by points A,B,C,D, and E on the ternary diagram which is FIG. 1, said silicoaluminophosphate having a characteristic X-ray powder diffraction pattern which contains at least the d-spacings set forth below in any one of Tables I, III, V, VII, IX, XIII, XVII, XXI, XXIII or XXV of U.S. Pat. No. 4,440,871.

22. The catalyst of claim 10 wherein said catalyst comprises between 5 and about 95 percent by weight of at least one inorganic oxide matrix component selected from the group consisting of clays, silicas, aluminas, silica-aluminas, silica-zirconias, silica-magnesias, alumina-borias and alumina-titanias.

23. The catalyst of claim 13 wherein the silicoaluminophosphate is SAPO-37.

* * * * *